ns

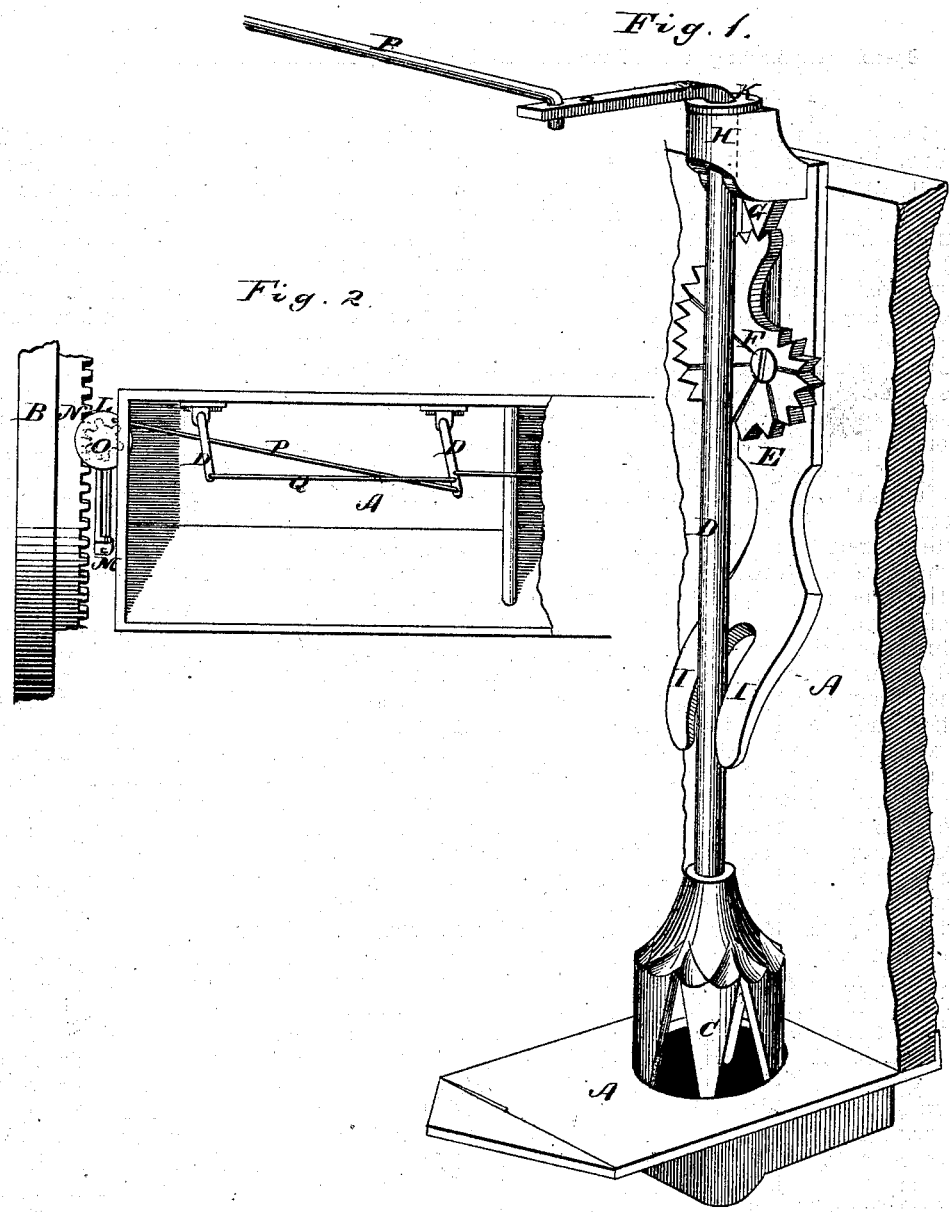

UNITED STATES PATENT OFFICE.

LYMAN WIGHT, OF WHITEWATER, AND ORISON G. EWINGS, OF LA GRANGE, WISCONSIN.

IMPROVEMENT IN SEEDING-MACHINES.

Specification forming part of Letters Patent No. 122,300, dated December 26, 1871.

*To all whom it may concern:*

Be it known that we, LYMAN WIGHT, of Whitewater, in the county of Walworth and State of Wisconsin, and ORISON G. EWINGS, of La Grange, in the county of Walworth and State of Wisconsin, have invented a new and Improved Feeding Device for Seeding-Machines; and we do hereby declare the following to be a full, clear, and exact description of the same, reference being had to the accompanying drawing forming part of this specification, in which—

Figure 1 is a perspective view of a feeder, showing its position within the grain-hopper of a seeding-machine. Fig. 2 is a plan view of parts of a seeding-machine, showing the means for operating the feeders.

Similar letters of reference indicate corresponding parts in the several figures of the drawing.

Our invention has for its object to improve the means for feeding the seed from the hopper of a seeding-machine for either drilling or broadcast seeding; and to this end the invention consists, first, in the construction of the feeders; secondly, in regulating the quantity of seed to be sown to the acre; thirdly, in the method of operating the feeders; and, lastly, in the combination of parts, as we will now proceed to describe.

In the accompanying drawing, A is the hopper of a seeding-machine, and B one of the supporting-wheels. The feeders are each constructed in the form of an inverted serrated or notched cup, C, attached to a vertical crank-shaft, D, in such a manner that the points formed by the serrations or notches shall enter the circular discharge-openings in the bottom of the hopper, fitting therein with easy contact. The feeders are hung loosely in a bracket, E, which bracket is slotted to fit over a short stud projecting from the front board of the hopper. Upon the end of the stud, between the bracket and shaft of the feeder, is pivoted a toothed cam, F, which engages with a spur or lug, G, affixed to or formed upon the bracket, immediately beneath its upper arm H, as shown in Fig. 1.

The quantity of seed fed to the acre, both in broadcast seeding and drilling, is determined by the position of the serrated cups with respect to the feed-openings in the hopper, and this position is regulated by the toothed cam in the following manner: When the feed is to be changed, to increase the quantity per acre, for example, the bracket is raised by the hand, sliding freely upon the stud of the cam. This, of course, lifts the cups C and increases the size of the discharge-openings formed by the serrations. The cam F is then turned to the left and engaged with the spur G, whereby the bracket is held in position and the cam prevented from slipping. To lessen the flow of seed from the hopper the cam is turned to the right, permitting the bracket to descend, as will be readily understood.

If desired, the face of the cam may be provided with graduations corresponding to the number of notches and extending from left to right, so that it may be readily and accurately set to feed the requisite quantity of seed per acre.

The lower arm I of the bracket is formed with an open slot, and the upper arm H constitutes an eye, by which the crank-shaft is suspended from the bracket.

This construction adapts the seed-cups to be held in the proper position within the hopper, and also admits of their being readily removed, when necessary; which latter result is effected by lifting said cups clear of the discharge-openings in the hopper, and then swinging the crank-shaft of each outward to clear the arm I and until the crank-arm of said shaft occupies a vertical position, when it will readily drop through the arm H and clear the bracket.

K is a washer, fitted over the crank-arm of each shaft, above the arm H, as shown in Fig. 1, and forms a continuous bearing-surface for said crank-arm when its shaft is oscillated or rotated.

We do not propose to confine ourselves to any particular method of operating the feeders, though preferably we employ the following means:

L is a pinion mounted upon a vertical shaft having its bearings in a bracket, M, pivoted to one end of the grain-hopper. The pinion engages with a toothed rim, N, affixed to the inner face of the supporting-wheel B, and is provided upon its upper surface with a crank-wheel, O; or its shaft is formed with a crank-arm, which is connected to the crank-shaft of one of the feeders by a rod, P. This rod passes through the end of the hopper, and inasmuch as the left-hand feeder is too near the end of said hopper to allow the proper movements of the rod the latter is connected to the crank-shaft of the second feeder, as shown in Fig. 2, the several crank-shafts being connected by rods Q. By this arrangement of mechanism an oscillating movement is imparted to all the feed-cups when the driving or supporting wheel of the machine is rotated. The oscillations of the feed-cups are regulated by shifting the connecting-rods nearer to or further from the brackets, for which purpose a series of holes are formed in the crank-arms. If desired, the feed-cups may be rotated instead of oscillated by adjusting the length of the crank-arms to correspond with the throw of the crank-wheel O. The feeders are thrown in and out of operation by any convenient arrangement of devices.

Having thus described our invention, what we claim is—

1. A feeder for seeding-machines, consisting of an inverted serrated cup adapted to oscillate or rotate within an opening in the grain-hopper so that the seed shall pass inside the cup before being discharged from the hopper, substantially as described, for the purpose specified.

2. The adjustable grain-feeder, consisting of an oscillating cup, C, mounted upon a crank-shaft, D, the slotted adjustable bracket E, and the toothed cam F, substantially as described, for the purpose specified.

3. In combination with the slotted bracket E carrying the feed-cup, we claim the spur G and graduated toothed cam F, substantially as described, for the purpose specified.

4. The slotted bracket E, constructed as described, with the eye H, slotted arm I, and spur G, substantially as described, for the purpose specified.

LYMAN WIGHT.
              ORISON G. EWINGS.

Witnesses:
  SYLVESTER HANSON,
  REBECCA D. HANSON.        (133)